Dec. 20, 1960
V. L. FRANTZ
2,965,135
BRACKETED VALVE
Filed April 15, 1958
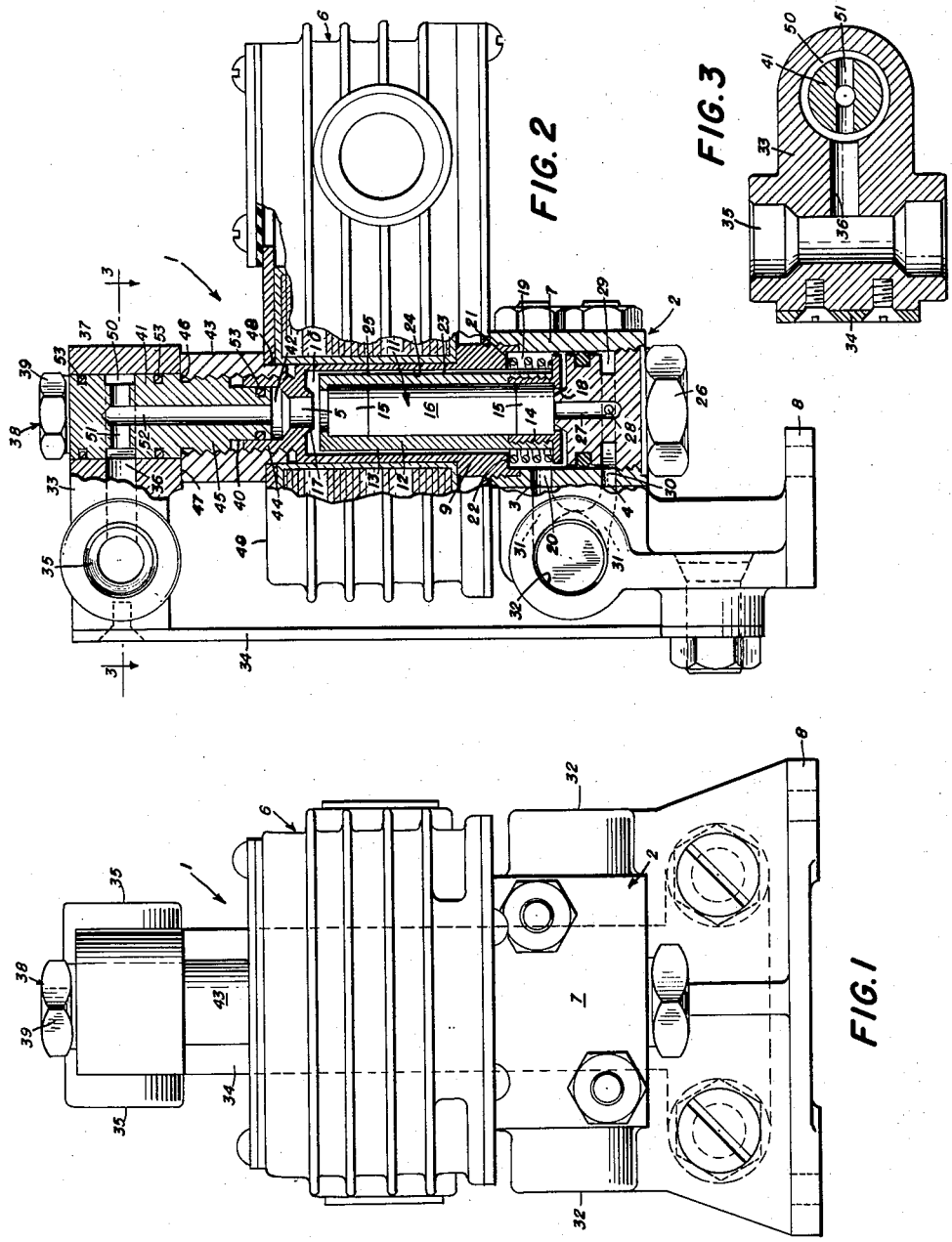
INVENTOR
VIRGIL L. FRANTZ
BY *Wilmer Mechlin*
HIS ATTORNEY 2,965,135
Patented Dec. 20, 1960

2,965,135

BRACKETED VALVE

Virgil L. Frantz, Salem, Va., assignor to Graham-White Sales Corporation, Salem, Va., a corporation of Virginia Filed Apr. 15, 1958, Ser. No. 728,585

9 Claims. (Cl. 137—625.27)

This invention relates to valves of the type termed "bracketed valves" in which the valve body is releasably mounted on and fluid-connected through a mounting bracket secured to a suitable support.

The advantage of a bracketed valve in enabling its body to be removed for repair or replacement without disturbing the fluid connections is well recognized and no particular difficulty has been experienced in adapting to this construction a valve in which the fluid connections to the body are either aligned or parallel. However, the adaptation to such construction of a valve in which any of the fluid connected ports in the body are angularly related has heretofore presented a problem. Two possible solutions have been proposed, in one of which any aligned or parallel ports were to be fluid connected through the mounting bracket and the fluid connection to the angularly related port was made directly to the valve body. This solution proved unsatisfactory because the shifting of the body at an angle to the angularly related connection in attaching the body to the mounting bracket rendered it practically impossible to make that connection fluid-tight. The other proposed solution was to make the fluid connections to all of the ports through one or more mounting brackets secured to the support and depend on a coupling carried by one of the brackets to make the angularly related connection with the valve body. However, this solution as well proved impractical, due to the impossibility of holding the valve body to the close manufacturing tolerances required to ensure connectability of the angularly related connection to the body.

The primary object of the present invention is to provide a bracketed valve wherein fluid connections to angularly related ports in the valve body are made through flexibly connected parts of the mounting bracket, thereby enabling one of the parts to yield sufficiently to accommodate manufacturing tolerances after the other has been secured to a platform or other support.

Another object of the invention is to provide a bracketed valve wherein fluid connections to any aligned or parallel ports in the valve body are made through a mounting bracket securable to support and connections to any angularly related to the first are made through a coupling flexibly mounted on the bracket.

An additional object of the invention is to provide a bracketed valve of the type described whereby the plurality of pipe connections to the valve may all be aligned or parallel and a bored plug forming part of the coupling and of such arrangement and construction as itself to have some flexibility is employed to make the fluid connection to angularly related ports in the body.

A further object of the invention is to adapt a valve having a plurality of angularly related ports in the valve body as a bracketed valve, whether one of the angularly related ports is employed as a vent or for a fluid connection.

Other objects and advantages of the invention will appear hereinafter in the detailed description, be particularly pointed out in the appended claims and be illustrated in the accompanying drawings, in which:

Figure 1 is a front elevational view of a preferred embodiment of the bracketed valve of the present invention;

Figure 2 is a side elevational view of the valve of Figure 1 with portions broken away and shown in section to more clearly illustrate certain of the details of construction; and Figure 3 is a vertical sectional view taken along the lines 3—3 of Figure 2.

Referring now in detail to the drawings, in which like reference characters designate like parts, the concept of the present invention, while applicable generally for adapting as a bracketed valve any valve having angularly related fluid connectable angularly related ports in its body, has been embodied for purposes of illustration in a solenoid-actuated bracketed valve designated as 1.

Similar in many respects to the solenoid-actuated valve shown in my copending application Serial No. 660,586, filed May 21, 1957, now Patent No. 2,887,126, granted May 19, 1959, the illustrated bracketed valve 1 is comprised of a body or housing 2 into which open a plurality and here, specifically, three ports. Two of the illustrated ports, 3 and 4, respectively, open into the lower end portion of the body 2 and are substantially parallel while the third port, 5, opens into the opposite end portion of the body and, instead of being parallel to or aligned with, is angularly related and here substantially normal to the first two ports.

In order to embody the concept of this invention, a valve must have at least two of the ports into its body not only angularly related, but each connected for contained flow of fluid through a conduit (not shown) to an associated device, such as a reservoir (not shown) or operating valve (not shown), and it is in this sense that the term "fluid-connected" is here employed. A port exhausting or venting to atmosphere and requiring no containment of the vented fluid thus would not come within the term. Wherefore, as applied to the illustrated embodiment, while either of the ports 3 and 4 might be an exhaust port, one of these ports and the third port, 5, to which the others are angularly related, must be fluid-connected to associated devices. In conformance with this requirement and as exemplary of the invention, the port 3 here serves as an outlet port, the port 4 as an exhaust port and the third port, 5, as an inlet port.

In the illustrated solenoid-actuated valve, the body 2 carries or supports a solenoid 6 and is formed of a bottom portion or base 7, bolted or otherwise releasably mounted on or attached to a main mounting bracket 8 or a main part of a multi-part mounting bracket, and a bushing 9 threaded to and projecting above the case, the main bracket 8 in turn being mountable on a suitable platform, or other support (not shown). Extending through the solenoid 6, the bushing 9 is made magnetic over the upper part of the solenoid to serve as the latter's pole piece. Together the base 7 and bushing 9 contain a valve chamber 10 in which slides or reciprocates a plunger or piston 11. Conveniently of the type to which my above-mentioned copending application is directed, the plunger 11 has a casing 12 having a round-cornered, substantially rectangular periphery 13, the casing with a cap 14 threaded into its lower end, containing a pair of rubber plugs 15 held apart by a rigid bar 16 and adapted alternately to seat against and seal one of a pair of frusto-conical valve seats 17 and 18, respectively, at the upper and lower ends of the valve chamber 10.

Normally open, the illustrated valve has the lower part 19 of its valve chamber with which the outlet port 3 communicates through a passageway 20, enlarged to receive a spring 21 acting between the cap 14 and a shoulder 22 on the bushing 9 normally to hold the lower valve seat 18 closed by the associated of the rubber plugs 15. In this position of the plunger, communication between the inlet and outlet ports 5 and 3 is established through the bypasses 23 between the side wall 24 of the valve chamber 10 and the flats 25 on the periphery 13 of the plunger 11. On reversal of its position by energization of the solenoid 6, the plunger 11 closes the upper valve seat 17, blocking off the inlet port 5, and opens the lower valve seat 18. Preferably formed on a plug 26 threaded into the base 7 of the body 2 below the valve chamber 10, the lower seat 18 is connected to the exhaust port 4 through axial and radial openings 27 and 28, respectively, and an annular channel 29, all formed in the plug, as well as a passageway 30 in the body 2 registering with the channel 29. Thus, when the lower valve seat 18 is open, communication between the outlet and exhaust ports 3 and 4 is established through the first passageway 20 from the outlet port, the valve chamber 10, the axial and radial openings 27 and 28, the channel 29 and the second passageway 30.

At least the outlet port 3 and, as in the illustrated embodiment, each of the outlet and exhaust ports 3 and 4, is adapted to register with a passage 31 in the main bracket 8 when the body 2 is mounted thereon, each of the illustrated passages in turn leading to one of a pair of separate apertures 32 in and at opposite sides of the main bracket. With each of its apertures 32 adapted for connection to a pipe (not shown), the illustrated double-apertured main bracket 8 has the advantage of enabling the disclosed bracketed valve to be converted to a normally closed valve without changing the body or its valve mechanism, merely by shifting the fluid connection from the aperture associated with the outlet valve 3 to that associated with the exhaust valve 4.

Unconnectable to the main mounting bracket 8 due to its angular relation to the other two ports, the third or, here, inlet port 5 is designed for connection instead to a second or auxiliary bracket or bracket part 33 flexibly or resiliently mounted or supported on the main bracket or port for yieldable and preferably reciprocable or swinging movement relative thereto and to the angularly related port. The desired flexible mounting may readily be obtained by connecting the main and auxiliary brackets 8 and 33 by a flexible element in the form of a flat spring 34 of spring steel or like material to the opposite ends of which the brackets are secured. For the illustrated third port 5, which is disposed substantially normal to the other two ports, the spring 34 upstands or extends upwardly from the main bracket and positions the auxiliary bracket above the level of the third port for swinging substantially horizontally relative to the main bracket and normal relative to the third port. Like the main bracket, the auxiliary bracket 33 may have an aperture 35 at either side for connecting a pipe thereto. However, since designed to make or be part of a fluid connection or coupling to but one port, the auxiliary bracket is of double-apertured construction mainly for convenience in connecting piping (not shown) thereto, both apertures preferably leadig to a common passage 36 so that the unused aperture has to be capped.

Outwardly from its pipe-receiving aperture or apertures 35, the auxiliary bracket 33 has a cylindrical socket or seat 37 extending therethrough and so disposed in the normal position of that bracket relative to the main bracket 8 as to parallel and, depending on the manufacturing tolerances, be substantially or roughly coaxial or in axial registry or alignment with the inlet port 5. For fluid coupling or connecting the auxiliary bracket 33 to the inlet port 5, there is insertible in the socket 37 an auxiliary plug or fluid-coupler or connection 38 turnable through a hex- or like head 39 and having a cylindrical neck or neck portion of substantially the diameter of and seatable and rotatable in the socket. The lower or inner end portion 40 of the plug 38, opposite its head 39, is of reduced cross-section relative to its neck 41 and adapted to seat in and mate or have a sliding fit with a cylindrical orifice or socket 42 in the upper end of the bushing 9, forming the upper part of the body 2 and containing, below the orifice, the inlet port 5.

While the plug 38 might be threaded or otherwise secured or attached directly to the body 2, this would make it difficult to provide a fluid-tight joint therebetween. It therefore is preferred to secure the plug and therethrough the auxiliary bracket 33 to the body by an interposed collar, ferrule or attaching or securing member 43 internally threaded to threadedly receive in one end an externally threaded upper end portion 44 of the bushing 9 and in the other an externally threaded stem 45 on the plug 38 between its neck 41 and lower end portion 40. To fix the position of the plug 38, when assembled, axially of the socket 37 in the auxiliary bracket 33, either the socket and plug are correspondingly stepped or, as here, the plug 38 at the lower extremity of its neck 41 has a downwardly facing annular shoulder 46 adapted to bear against the upper end 47 of the collar 43. For the illustrated solenoid-actuated bracket valve, it also is preferred that the collar 43 be necked, as at 48, adjacent its lower end, to fit into the solenoid 6 about the threaded upper end portion 44 of the bushing 9, as well as to bear against the upper face 49 of the solenoid so as to relieve the bushing of any transverse stresses.

With the auxiliary bracket 33 and body 2 connected or secured through the plug 38 and the collar 43, fluid communication between the fluid-connected of the apertures 35 in the bracket and the inlet port 5 is established by leading the common passage 36 which leads from the apertures to the socket 37 in position axially thereof to register with a circumferential groove 50 in the neck of the plug, the groove and connecting the groove 50 through one or more radial bores, ways or drillings 51 in the plug to an axial bore or way 52 in and opening onto the lower end of the plug toward and confronting the inlet port 5. To ensure that the coupling or connection between the auxiliary bracket and the body is fluid-tight, the joints between the neck of the plug 41 and the socket 37, above and below the circumferential groove 50 and between the lower end portion 40 of the plug and the orifice 42 in the bushing 9, preferably are sealed by O-rings 53 which conveniently may be carried by the plug.

In installing the illustrated bracketed valve, the main mounting bracket 8, flexibly mounting the auxiliary mounting bracket 33, is secured to a suitable platform, or other support (not shown) and the pipe connections with the various associated devices to which the valve is to be connected are selectively made through the several apertures 32 and 35 in the main and auxiliary brackets. The body 2 of the valve, carrying the solenoid 6 and with the collar 43 screwed onto the bushing 9, is then attached through its base 7 to the main bracket 8 to fluid-connect at least one of the parallel ports 3 and 4 in the base through the related of the passages 31 and apertures 32 in the main bracket, to an associated device. During such attachment of the body 2 to the main bracket 8, the plug 38 for the auxiliary bracket 33 is withdrawn so that the collar 43 is free to slide under that bracket. The socket 37 in the auxiliary bracket 33 and the third, angularly related or inlet port 5 then usually will be misaligned axially or displaced radially to an extent up to the limit of the manufacturing tolerances in the several parts. However, on insertion of the plug 38 into the socket 37 in the auxiliary bracket 33, any misalignment is readily corrected, due to the flexible mounting of the auxiliary bracket, by shifting the latter in one direction or another relative to the inlet port 5 so that the threaded stem 45 of the plug can grip the internally threaded collar 43, permitting the plug to be screwed into assembled position with its axial bore 52 aligned with the inlet port 5. Since alignment of the socket 37 and inlet port 5 may require the auxiliary bracket to be shifted or swung toward or away from the body 2, if the main bracket 8 is mounted on a wall, the supporting spring 34 should be spaced from the wall by shimming or like means sufficiently to accommodate movement of the auxiliary bracket theretoward to the extent necessary.

From the above detailed description, it will be apparent that there has been provided a bracketed valve which, while having a plurality of angularly related ports, may have these ports fluid-connected to associated devices through its bracketed mounting and, thereafter, have its body removed for repair or replacement without disturbing the fluid connections. It should be understood that the described and disclosed embodiment is merely exemplary of the invention and that all modifications are intended to be included which do not depart from either the spirit of the invention or the scope of the appended claims.

Having described my invention, I claim:

1. A bracketed valve comprising a valve body, a plurality of angularly related ports in said body, a main bracket mounting said body and having a passage registering with one of said ports, an auxiliary bracket having an aperture fluid-connected to another of said ports, and means flexibly mounting said auxiliary bracket on said main bracket, said ports being fluid-connectable exteriorly through said brackets.

2. A bracketed valve comprising a valve body, a plurality of angularly related ports in said body for fluid connection to associated devices, a main bracket mounting said body, an auxiliary bracket, means flexibly mounting said auxiliary bracket on said main bracket, apertures in said brackets for selective fluid connection to said devices, and passages in said brackets connected to said selected apertures and each fluid connected to one of said ports for fluid-connecting said ports to said devices through said brackets.

3. A bracketed valve comprising a valve body, a plurality of angularly related ports in said body, a main bracket mounting said body and having a passage registering with one of said ports, an auxiliary bracket, means flexibly mounting said auxiliary bracket on said main bracket for yieldable movement thereof relative to said body, and coupling means connected to said auxiliary bracket for fluid-connecting a passage therein to said other port, said ports being fluid-connectable exteriorly through said brackets.

4. A bracketed valve comprising a valve body, a plurality of angularly related ports in said body, a main bracket mounting said body and having a passage registering with one of said ports, an auxiliary bracket, means flexibly mounting said auxiliary bracket on said main bracket for movement thereof relative to said other port, means connected to said auxiliary bracket for fluid-connecting a passage therein to said other port, and means for securing said auxiliary bracket to said body, said ports being fluid-connectable exteriorly through said brackets.

5. A bracketed valve comprising a valve body, a plurality of angularly related ports in said body, a main bracket mounting said body and having a passage registering with one of said ports, an auxiliary bracket, means flexibly mounting said auxiliary bracket on said main bracket for yieldable movement thereof relative to said other port, means connected to said auxiliary bracket for fluid-connecting a passage therein to said other port, and means engageable with said fluid-connecting means for securing said auxiliary bracket to said body, said ports being fluid-connectable exteriorly through said brackets.

6. A bracketed valve comprising a body, a plurality of angularly related ports in said body, a main bracket mounting said body and having a passage registering with one of said ports, an auxiliary bracket flexibly mounted on said main bracket and having a socket extending therethrough and substantially axially alignable with another of said ports on attachment of said body to said main bracket, a plug insertible in said socket and having an end portion matable with said body in confronting relation with said other port, said plug being bored for fluid-connecting a passage in said auxiliary bracket to said other port, and means carried by said body and engageable with said plug for securing said auxiliary bracket to said body.

7. A bracketed valve comprising a body, a plurality of angularly related ports in said body, a main bracket mounting said body and having a passage registering with one of said ports, an auxiliary bracket flexibly mounted on said main bracket and having a socket extending therethrough and substantially axially alignable with another of said ports on attachment of said body to said main bracket, a plug insertible in said socket and having an end portion matable with said body in confronting relation with said other port, said plug being bored for fluid-connecting a passage in said auxiliary bracket to said other port, and a collar carried by and encircling said body about said other port and threadedly engageable with said plug for securing said auxiliary bracket to said body.

8. A bracketed valve comprising a body, a plurality of angularly related ports in said body, a main bracket mounting said body and having a passage registering with one of said ports, an auxiliary bracket flexibly mounted on said main bracket and having a socket extending therethrough and substantially axially alignable with another of said ports on attachment of said body to said main bracket, a plug rotatable in said aperture and having an end portion receivable in said body in axial alignment with said other port, said plug being bored for fluid connection of a passage in said auxiliary bracket to said other port, and a collar carried by and threaded onto said body and threadedly engageable with a stem of said plug below said aperture for attaching said auxiliary bracket to said body.

9. A bracketed valve comprising a body, a port in said body, a second port in said body and disposed substantially normal to said first port, a main bracket releasably mounting said body and having a passage registering with said first port for fluid connection thereof to an associated device, an auxiliary bracket, spring means flexibly mounting said auxiliary bracket on said main bracket for yieldable movement of said auxiliary bracket substantially normal to said second port, a cylindrical socket in said auxiliary bracket and substantially axially aligned with said second port on mounting of said body on said main bracket, a plug rotatable in said socket and insertable into said body in axial alignment with said second port, said plug being bored for fluid connecting a passage in said auxiliary bracket to said second port, a collar threaded onto said body about said second port and threadedly engageable with a stem of said plug for securing said auxiliary bracket to said body, and apertures in said brackets and each connected to one of said passages for fluid connecting said ports through said brackets to associated devices.

References Cited in the file of this patent
UNITED STATES PATENTS

| | | |
|---|---|---|
| 1,333,626 | Moard | Mar. 16, 1920 |
| 2,267,515 | Wilcox | Dec. 23, 1941 |
| 2,289,310 | Steel | July 7, 1942 |